(12) United States Patent
Andriolo et al.

(10) Patent No.: US 7,748,078 B2
(45) Date of Patent: Jul. 6, 2010

(54) BLOWER-VACUUM DEVICE

(75) Inventors: Paolo Andriolo, Vicenza (IT); Qibin Wang, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 11/948,712

(22) Filed: Nov. 30, 2007

(65) Prior Publication Data

US 2008/0307602 A1 Dec. 18, 2008

(30) Foreign Application Priority Data

Jun. 14, 2007 (CN) .......................... 2007 1 0023276

(51) Int. Cl.
*A47L 5/14* (2006.01)
*A47L 5/00* (2006.01)
*A47L 9/00* (2006.01)

(52) U.S. Cl. .......................... 15/345; 15/330
(58) Field of Classification Search ............... 15/330, 15/345

See application file for complete search history.

(56) References Cited

U.S. PATENT DOCUMENTS

| 4,476,607 | A | * | 10/1984 | Ross | 15/339 |
| 5,535,479 | A | * | 7/1996 | Pink et al. | 15/410 |
| 5,604,954 | A | * | 2/1997 | Webster et al. | 15/330 |
| 6,000,096 | A | * | 12/1999 | Everts et al. | 15/330 |
| 6,141,823 | A | * | 11/2000 | Fujiwara et al. | 15/330 |
| 6,141,824 | A | * | 11/2000 | Fujiwara et al. | 15/330 |
| 6,735,813 | B2 | * | 5/2004 | Oohama | 15/330 |
| 7,266,860 | B2 | * | 9/2007 | Tate et al. | 15/330 |

OTHER PUBLICATIONS

Certified Chinese Application No. 2007/10023276.1 filed on June 14, 2007.

* cited by examiner

*Primary Examiner*—Bryan R Muller
(74) *Attorney, Agent, or Firm*—Howard & Howard Attorneys PLLC

(57) ABSTRACT

The present invention relates to a portable blower-vacuum device which comprises a motor (3) operated by a switch (7) and located in a main body (2) and a fan (4) drivable by the motor. A vacuum nozzle (11) and a blower nozzle (12) are associated with the main body and the vacuum nozzle comprises a main portion (14a) extending in a direction of an axis (Z1) of the main portion and a terminal portion (14b) with an axis (Z2) angularly disposed with respect to the axis (Z1) of the main portion.

14 Claims, 7 Drawing Sheets

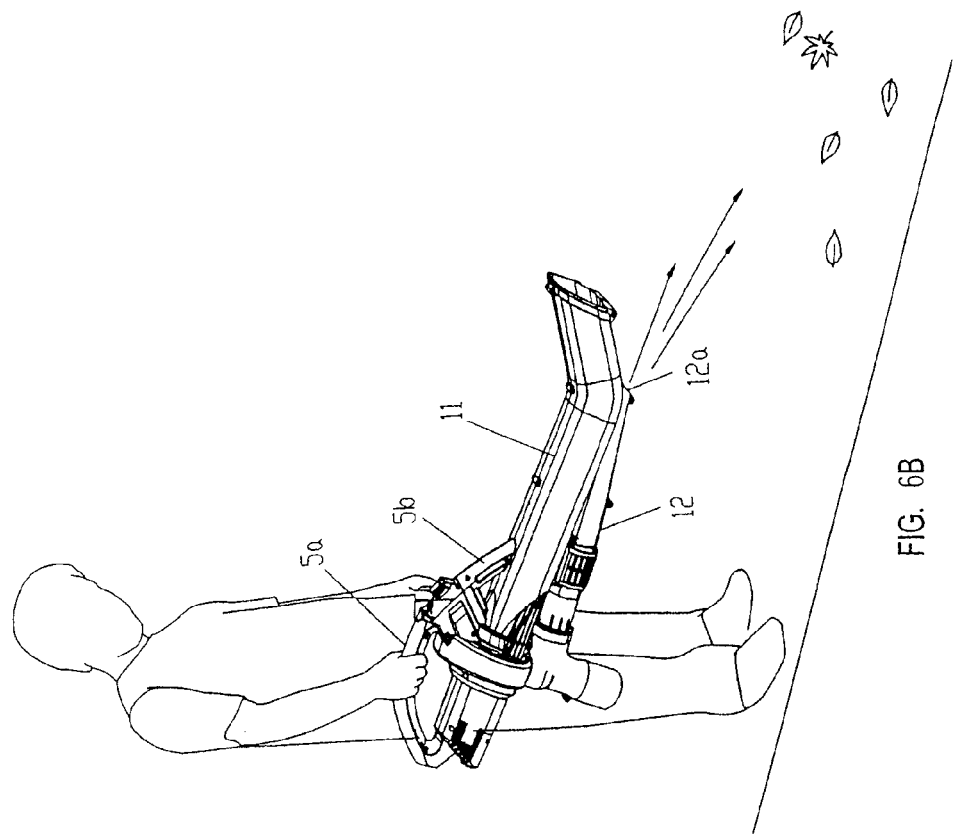
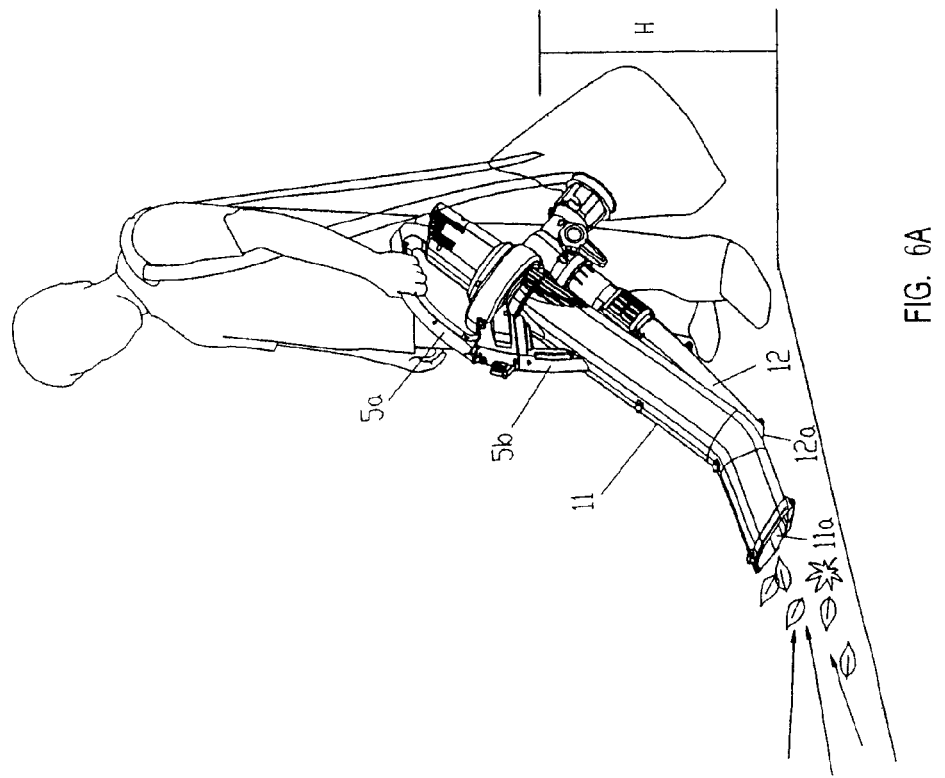
FIG. 6A
FIG. 6B

BLOWER-VACUUM DEVICE

The subject patent application claims priority to and all the benefits of Chinese Patent Application No. 2007-10023276.1, which was filed on 14 Jun. 2007 with the State Intellectual Property Office of the People's Republic of China.

FIELD OF THE INVENTION

The present invention relates to a portable blower-vacuum device.

BACKGROUND

A portable blower-vacuum device can be converted between a blowing mode or vacuum mode. Convertible blower-vacuum devices are widely used by homeowners and grounds keepers to keep outdoor areas clear of leaves, grass clippings and debris.

A conventional blower-vacuum device disclosed in U.S. Pat. No. 6,141,823 comprises a vacuum nozzle and a blower nozzle extending in parallel to each other and connected to a main body housing a fan and a motor. The main body is provided with a dust bag. In the vacuum mode, air is directly sucked from the vacuum nozzle and introduced into the dust bag by the rotation of the fan. In the blower mode, the air is similarly sucked from the vacuum nozzle and is directed towards the blower nozzle. The blower nozzle is tapered such that its diameter is gradually reduced towards the blower port in order to increase air velocity blowing through the blower nozzle. The vacuum nozzle has a constant diameter along its length.

Another blower-vacuum device is disclosed in U.S. Pat. No. 6,735,813. The blower-vacuum device includes a fan, a main body and a single nozzle. The main body is formed with a vacuum pathway upstream from the fan and a blower pathway downstream from the fan with respect to the flow of air. The main body is formed with an attachment hole in fluid communication with both the vacuum pathway and the blower pathway. The attachment hole supports the nozzle rotationally between a vacuum mode orientation and a blower mode orientation.

U.S. Pat. No. 4,476,607 discloses a lightweight portable vacuum cleaner and attachment nozzle which may be readily carried by an operator to vacuum both normally accessible and normally inaccessible areas. The vacuum cleaner comprises an elbow-shaped plastic housing which encloses a filter bag and blower motor. The vacuum is carried under the arm of the operator supported from a strap that goes over the operator's shoulder.

The aforementioned blower-vacuum devices are all provided with a straight vacuum nozzle having a length consistent with safety standards. This means that the vacuum nozzle or the blower/vacuum nozzle generally have a lengthy configuration. However the elongate nozzle leads to blower-vacuum device with a discordant design which makes it difficult to hold with only one handle when the operator converts it between the vacuum mode and the blower mode.

SUMMARY OF THE INVENTION

In order to overcomes certain disadvantages of the prior art, it is an object of the present invention to provide an improved blower-vacuum design which minimizes the length of the vacuum nozzle, whilst making the vacuum more effective and its operating more comfortable.

Thus viewed from the present invention provides a blower-vacuum device comprising:

a main body;

a motor operated by a switch which is housed in the main body;

a motor-driven fan capable of generating an air flow;

a vacuum nozzle associated with the main body upstream of the motor-driven fan and a blower nozzle associated with the main body downstream of the motor-driven fan, wherein the vacuum nozzle comprises an elongate main portion extending substantially coaxially with an axis Z1 of the main body and a terminal portion extending along an axis Z2 angularly with respect to the axis Z1 of the main body.

The vacuum nozzle may have a non-linear configuration. The configuration may be flat, tapered, round, trapezoidal or curved. The axis Z2 may be offset from the axis of the fan. The blower nozzle may have any non-linear configuration. The configuration may be flat, tapered, round, trapezoidal or curved.

Typically the angle β between the axis Z1 and the axis Z2 is obtuse. Preferably the angle is in the range 90 to 180°, particularly preferably 120 to 150°.

Preferably the terminal portion extends along an axis Z2 angularly away from the blower nozzle (eg upwardly away from the ground).

The vacuum nozzle may be positioned superior to (eg over) the blower nozzle. The blower nozzle may be positioned superior to (eg over) the vacuum nozzle.

Typically the terminal portion, the elongate main portion and the blower nozzle are substantially coplanar.

Preferably the length of the terminal portion is in the range 5 mm to 1 m.

Preferably the vacuum nozzle is positioned superior to (eg over) the blower nozzle.

Particularly preferably the vacuum nozzle is positioned superior to the blower nozzle and the vacuum nozzle has a deflection point, wherein the blower nozzle has a blower port at its distal end substantially adjacent to the deflection point.

Preferably the blower port is tapered substantially equiangularly to the angle β between the axis Z1 and the axis Z2

Preferably the vacuum nozzle and the blower nozzle are detachably associated with the main body and the vacuum nozzle is fixed to the blower nozzle.

Preferably the main body comprises: a motor housing the motor and a volute housing the fan, wherein the motor housing is formed integrally with the volute housing.

Preferably the blower-vacuum device further comprises:

a handle assembly, wherein the handle assembly comprises: a first grip section disposed on the main body and a second grip section disposed on the vacuum nozzle.

Preferably the blower-vacuum device further comprises:

a safety interlock, wherein the safety interlock is disposed between the first grip section and the second grip section such that only when the vacuum nozzle is attached to the main body is the motor activatable and only when the motor is inactive is the vacuum nozzle detachable.

Preferably the blower-vacuum device further comprises:

a variable airflow adjustment including an aperture in the blower nozzle and a rotatable collar mounted rotationally about the blower nozzle over the aperture.

Preferably the blower-vacuum device further comprises:

an airflow guide mechanism disposed between the vacuum nozzle and blower nozzle for guiding the airflow blowout from the aperture.

Viewed from a further aspect the present invention provides a blower-vacuum device comprising:

a main body;

a motor operated by a switch which is housed in the main body;

a motor-driven fan capable of generating an air flow; and a vacuum nozzle associated with the main body upstream of the motor-driven fan and a blower nozzle associated with the main body downstream of the motor-driven fan, wherein the vacuum nozzle is curved and attached superiorly adjacent to the blower nozzle.

Viewed from a yet further aspect the present invention provides a blower-vacuum device convertible between a blower mode and a vacuum mode comprising:

a main body;

a motor operated by a switch which is housed in the main body;

a motor-driven fan capable of generating an air flow;

a nozzle attachment associated with the main body wherein the nozzle attachment comprises a vacuum nozzle which is curved.

The motor may comprise an electric motor, internal combustion engine or other type of power supply The fan may include a debris engaging structure or serrations for facilitating a finer mulch of air-entrained debris.

BRIEF DESCRIPTION OF THE DRAWINGS

The present invention will now be described in a non-limitative sense with reference to the accompanying Figures in which common reference numerals represent corresponding parts throughout:

FIG. 5C is a schematic view according to FIG. 5, wherein the nozzle attachment is engaged with the main body and the actuator is switched on;

FIG. 6A is a schematic view according to the present invention, wherein the user holds the blower-vacuum with one hand in the vacuum mode; and FIG. 6B is a schematic view according to the present invention, wherein the user holds the blower-vacuum with one hand in the blower mode;

DESCRIPTION OF THE PREFERRED EMBODIMENTS

Figure 1:
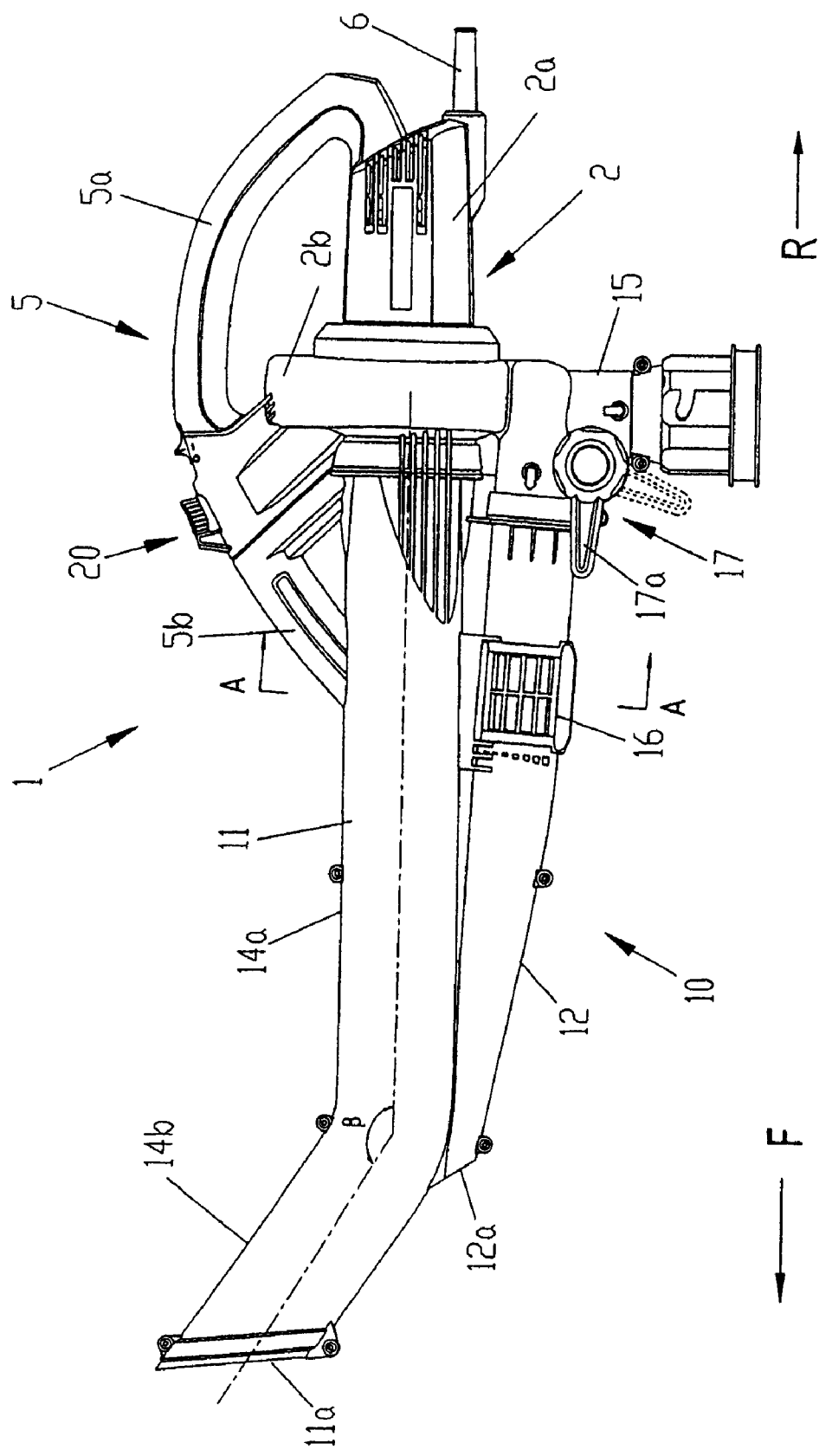
FIG. 1 illustrates an embodiment of the blower-vacuum device of the present invention.
Figure 2:
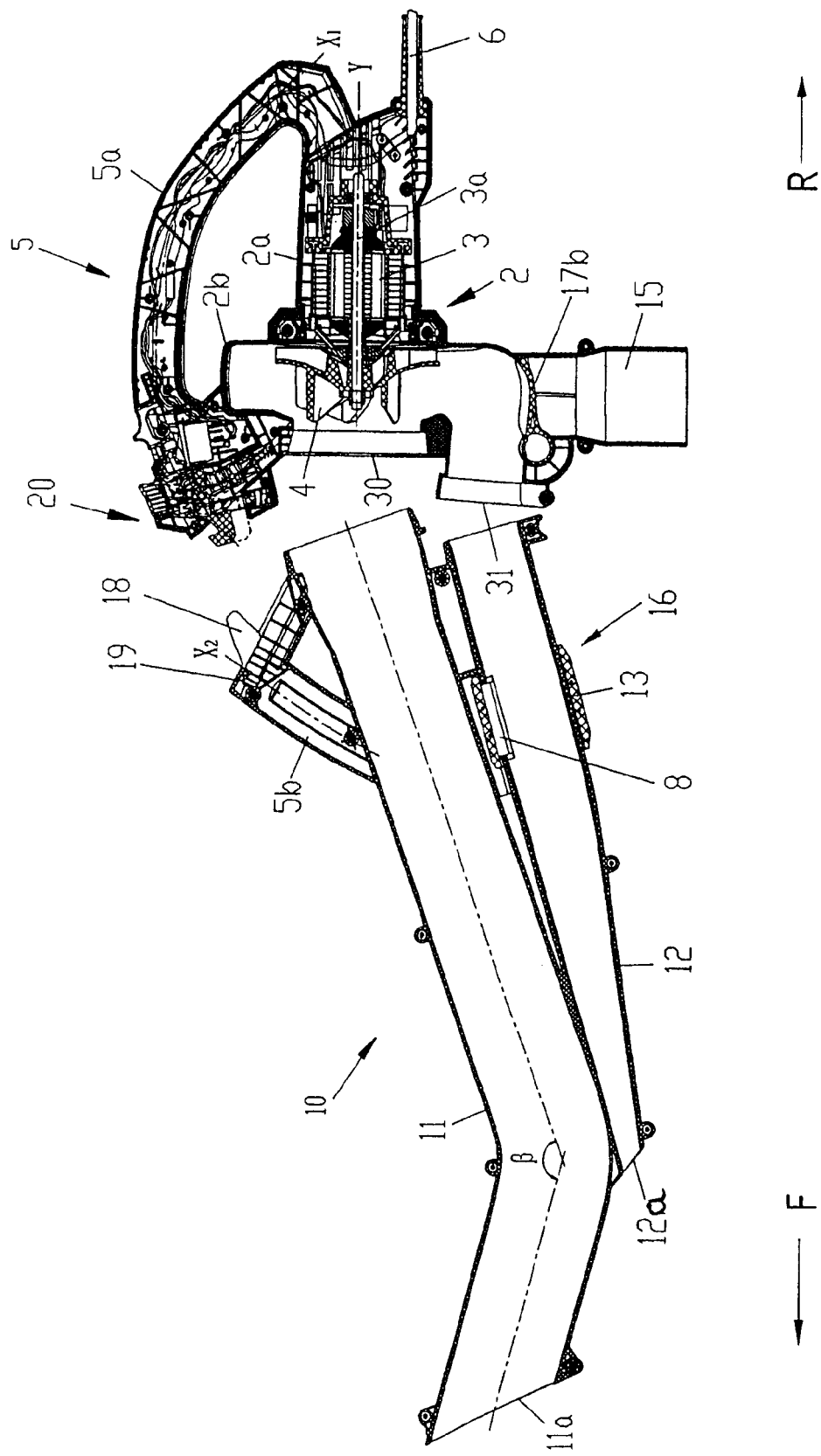
FIG. 2 is a cross-sectional view according to FIG. 1, wherein the nozzle attachment is disengaged from the main body.
Figure 3:
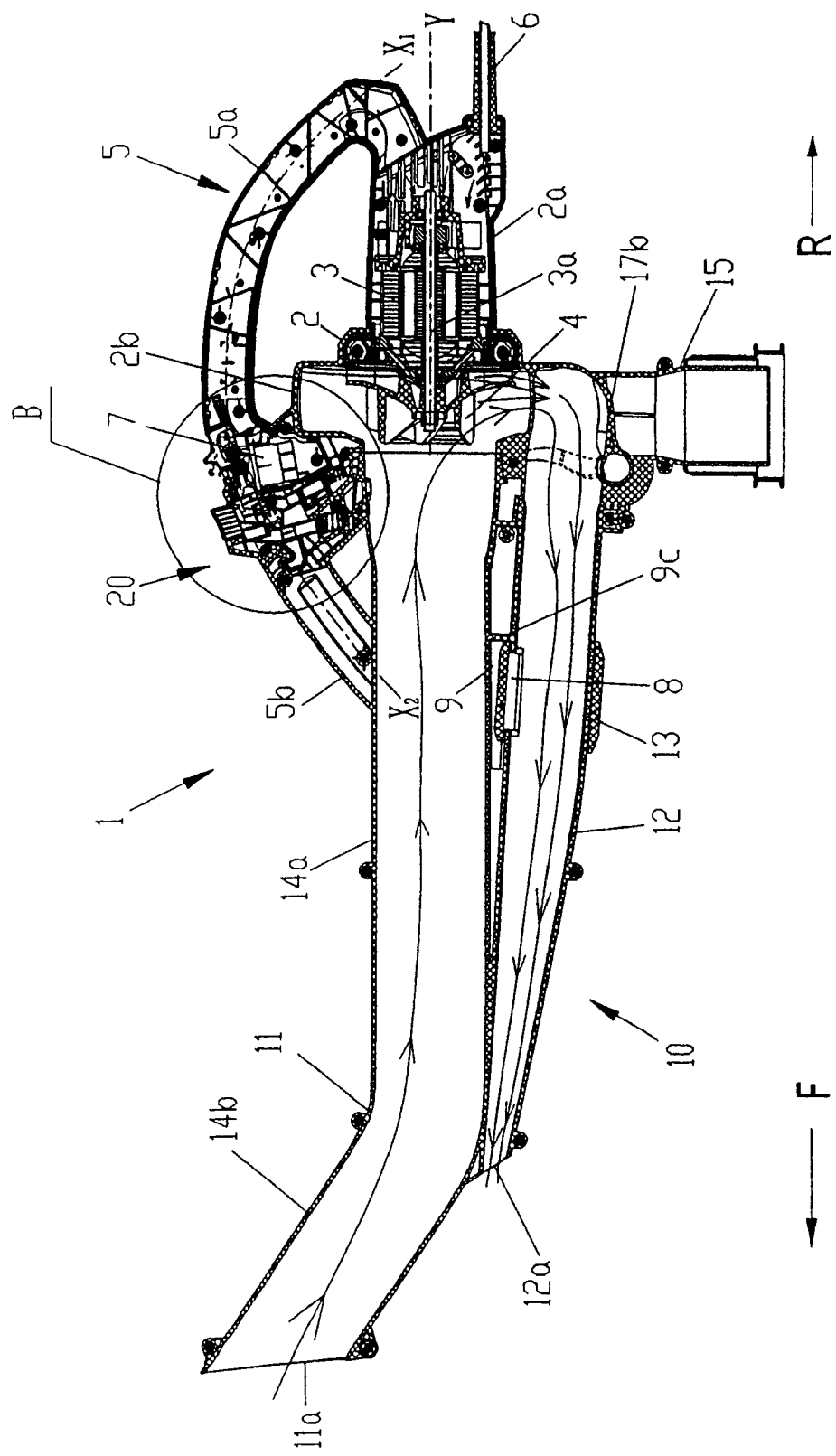
FIG. 3 is a cross-sectional view according to FIG. 1.

An embodiment of a portable blower-vacuum device 1 according to the invention is illustrated in FIGS. 1 to 3. The portable blower-vacuum device 1 comprises a main body 2 to which is connected stably and detachably an elongate nozzle attachment 10 and a collecting container (not shown). For the sake of illustration, arrow F indicates the front direction and arrow R indicates the rear direction of the blower-vacuum device 1.

The main body 2 comprises a motor housing 2a which houses a motor 3 and a volute housing 2b formed integrally with the motor housing 2a which houses a fan 4. The motor 3 imparts a rotational force to the fan 4 via an output shaft 3a which defines an axis Y. The fan 4 includes a plurality of vanes for generating an air-flow as the fan 4 is driven by the motor 3. The volute housing 2b includes an inlet port 30 and an outlet port 31. The elongate nozzle attachment 10 includes a vacuum nozzle 11 having a vacuum port 11a at its front end and a blower nozzle 12 having a blower port 12a at its front end. The vacuum nozzle 11 is connected superiorly adjacent to the blower nozzle 12 and forms a one-piece elongate nozzle attachment 10. The vacuum nozzle 11 is substantially cylindrical and has a substantially constant diameter along its length. A dust nozzle 15 is connected to and positioned beneath the volute housing 2b.

A rear end of the vacuum nozzle 11 is mounted on the inlet port 30 and a rear end of the blower nozzle 12 is mounted on the outlet port 31. A safety interlock 20 is disposed between the main body 2 and elongate nozzle attachment 10 to ensure the safety of the operator. An electric cord 6 is attached to the rear end of the motor housing 2a for supplying power to the motor 3.

A handle assembly 5 comprises an elongate first grip section 5a defining a first elongate central axis X1 and a second grip section 5b defining a second central axis X2 which are disposed respectively on the main body 2 and the vacuum nozzle 11. When the elongate nozzle attachment 10 is attached to the main body 2, the first grip section 5a is connected to the second grip section 5b forming an integrated operating handle 5. The first axis X1 and the second central axis X2 form an integrated central axis of the handle assembly 5.

A change-over switch 17 comprises a knob 17a disposed exteriorly to the main body 2 and a flap 17b disposed interiorly to the main body 2 for switching the device 1 between the blower mode and the vacuum mode. The operator can select the different operating modes only by rotating the knob 17a according to the orientations marked on the main body 2. When the knob 17a is rotated in a counterclockwise direction from a first position to a second position (which is indicated with a broken line in FIG. 1), the flap 17b engages the upper wall of the blower nozzle 12 so as to shut off the outlet port 31 (as indicated by a broken line in FIG. 3). The volute housing 2b is in communication with the dust nozzle 15 and out of communication with the blower nozzle 12. This arrangement constitutes the vacuum mode. By rotation of the knob 17a in a clockwise direction, the flap 17b engages a wall of the dust nozzle 15. Thus the outlet port 31 is opened and the volute housing 2b is in communication with the blower nozzle 12. This arrangement constitutes the blower mode in which the fan 4 rotates (as in the vacuum mode) so that air is sucked through the vacuum port 11a of the vacuum nozzle 11 and is introduced into the volute housing 2b. The sucked air passes through the fan 4 and the outlet port 31 and is introduced into the blower nozzle 12 from where it is discharged through the blower port 12a. The blower nozzle 12 has a tapered cylindrical configuration in which its diameter decreases gradually towards the blower port 12a such that air velocity blowing from the blower nozzle 12 is higher than air velocity sucked into the vacuum nozzle 11. Accordingly, larger dust (and other) particles will not be sucked in through the vacuum port 11a in the blower mode.

The vacuum nozzle 11 has a main elongate portion 14a which extends along a longitudinal axis Z1 and a deflected end portion 14b which extends along an axis Z2. In this embodiment, an angle β of approximately 145 degrees exists between Z1 and Z2. The length of the blower nozzle 12 is shorter than the vacuum nozzle 11 and the blower port 12a of the blower nozzle 12 is approximately aligned with the point of deflection of the vacuum nozzle 11.

Figure 4B:
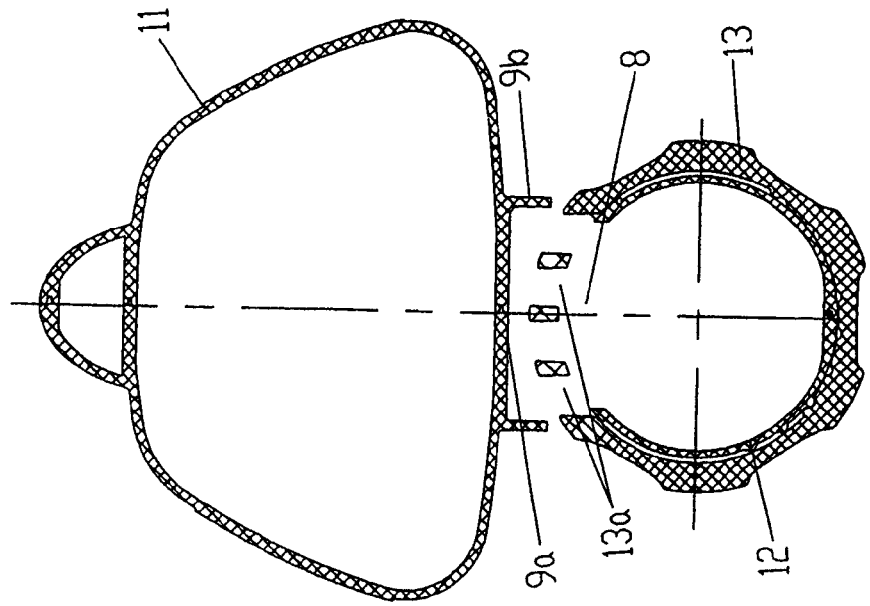
FIG. 4B is an enlarged view taken along line A-A in FIG. 1, wherein the aperture communicates with the external atmosphere.
Figure 4A:
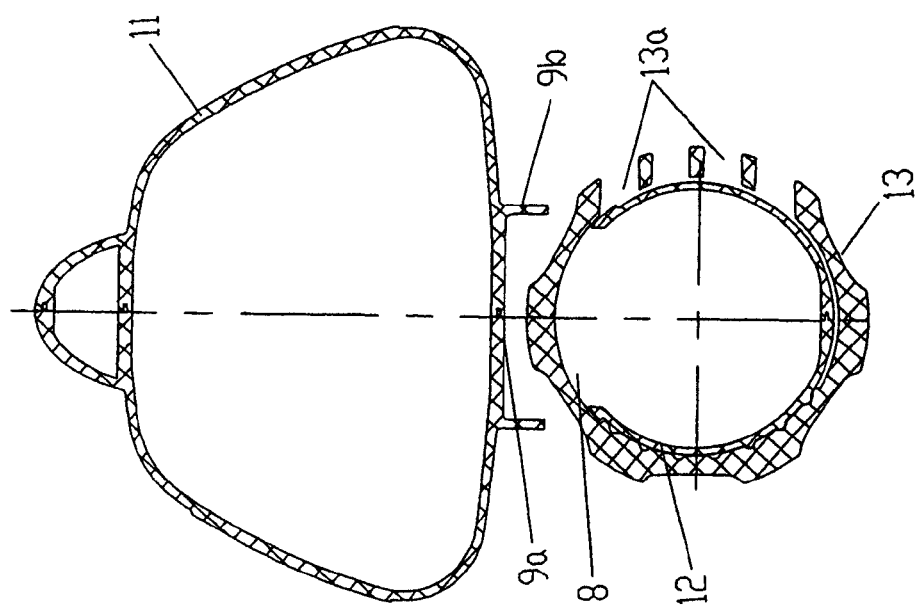
FIG. 4A is an enlarged view taken along line A-A in FIG. 1, wherein the aperture of the blower nozzle is closed by the collar of airflow adjustment.

A variable airflow adjustment 16 is made possible by an aperture 8 in the wall of the blower nozzle 12. Mounted for rotation about the wall directly over the aperture 8 is a rotatable collar 13. Referring to FIG. 4A and FIG. 4B, the rotatable collar 13 has a partial apertured portion 13a. By rotating collar 13, the whole or a portion of aperture 8 in the tubular wall is exposed via the apertured portion 13a thereby enabling a preselected amount of airflow to be diverted out of the side of the wall to alter the airflow which is discharged from the blower port 12a. An airflow guide mechanism 9 is disposed between the vacuum nozzle 11 and blower nozzle 12. The airflow guide mechanism 9 comprises a pair of side plates 9b which is disposed beneath the vacuum nozzle 11 and on top of the aperture 8 of the blower nozzle 12. The distance between the two side plates 9b is slight larger than the aperture 8. A top plate 9a formed by the wall of the vacuum nozzle 11 and a back plate 9c located behind the airflow adjustment 16 are shown in FIG. 3.

Under the normal operating conditions of the blower mode, the airflow discharged from the blower port 12a is directed at debris such as grass or leaves which are mostly propelled forwardly. Some light debris is blown upwardly or backwards towards the user when the airflow guide mechanism 9 is closed. When the airflow adjustment 16 is opened, communication of the airflow between the aperture 8 and the apertured portion 13a of the collar 13 causes at least partial air overflow from the blower nozzle 12 through the aperture 8. The partial airflow will be guided by the airflow guide mechanism 9 and help to blow forwardly from the rear of the blower nozzle 12a to avoid blowing the user. Thus the user can face and blow the debris to a distant location for removal.

Figure 5:
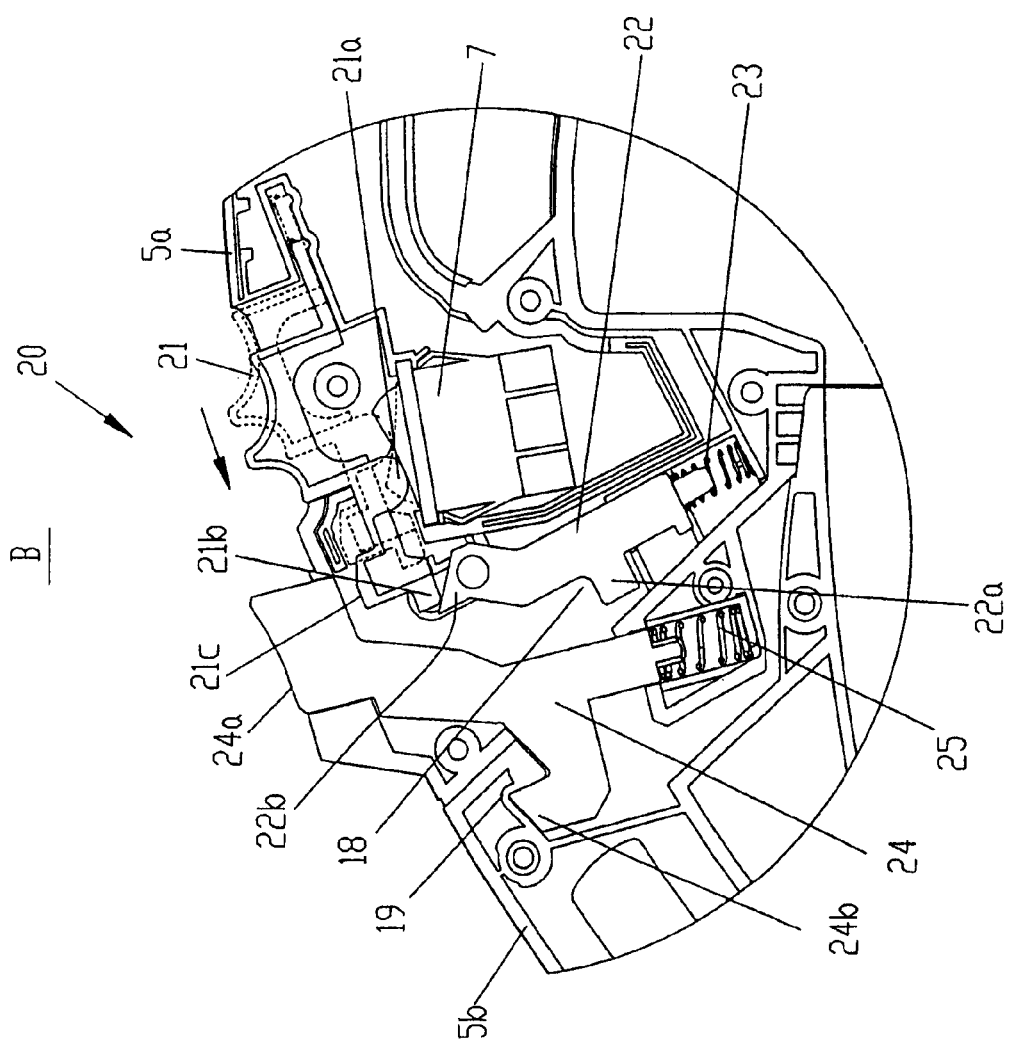
FIG. 5 is a partial enlarged view according to mark B in FIG. 3, wherein the interlock mechanism is shown.

Referring to FIG. 5, a switch 7 is located in the main body 2. The safety interlock 20 comprises an actuating member 21 slidably mounted on the front end of the first grip section 5a. The actuating member 21 is movable between a forward "on" position and a rearward "off" position. A locking member 24 is movably disposed in the main body 2. A sliding unit 22 is disposed between the locking member 24 and the actuating member 21 for selectively engaging the actuating member 21. The actuating member 21 comprises a key point 21a for actuating the switch 7, a stop portion 21b and a stop portion 21c. In order to activate the motor 3, the switch 7 is depressed by the key point 21a of the actuating member 21 by moving the actuating member 21 forward along the direction indicated as the arrow. The locking member 24 comprises a press portion 24a which extends over the surface of the grip section 5a. A hook 24b engaged with a recess 19 is disposed at a rear end of the second grip section 5b. The locking member 24 is biased by a spring 25 which is located in the main body 2 for supporting the locking member 24 to move upwardly and downwardly. The sliding unit 22 has a protruding shoulder 22a disposed in the intermediate portion and a stop portion 22b disposed at its upper end. The sliding unit 22 is biased by a spring 23 which is disposed under the sliding unit 22. In addition, an extending block 18 is disposed on the second grip section 5b of the nozzle attachment 10 (shown in FIG. 2) for selectively engaging the protruding shoulder 22a of the sliding unit 22.

Figure 5C:
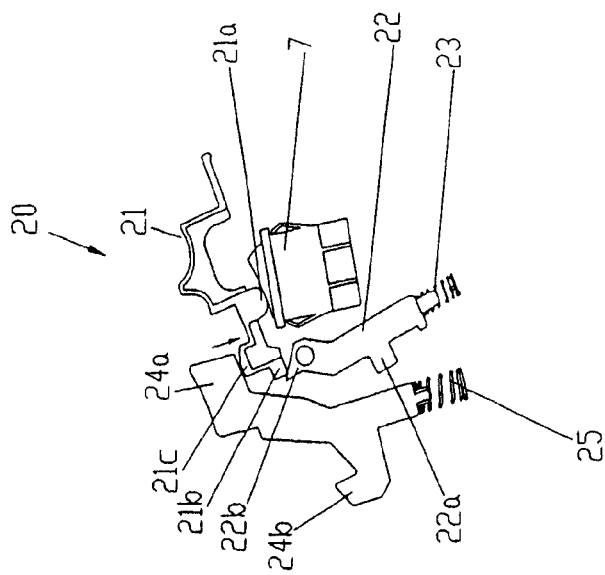
Figure 5B:
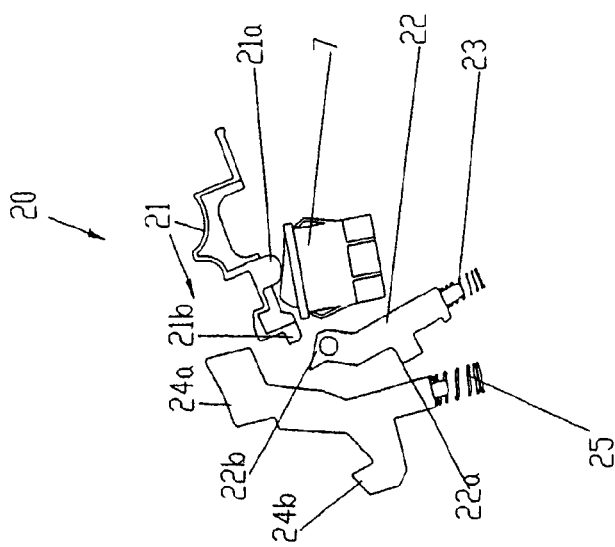
FIG. 5B is a schematic view according to FIG. 5, wherein the nozzle attachment is engaged with the main body.
Figure 5A:
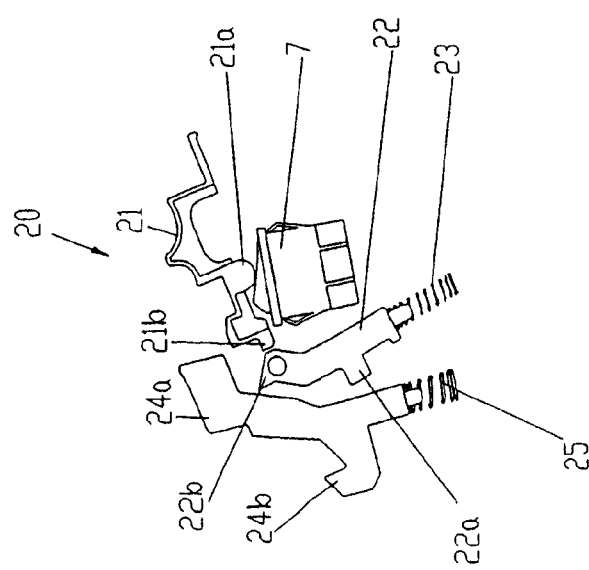
FIG. 5A is a schematic view according to FIG. 5, wherein the nozzle attachment is disengaged from the main body.

Referring to FIG. 5A, when the elongate nozzle attachment 10 disengages the main body 2, the sliding unit 22 biased by the spring 23 is located at its first position. The stop portion 22b of the sliding unit 22 engages the stop portion 21b of the actuating member 21 for preventing the movement of the actuating member 21. The locking member 24 is located at its first position biased by the spring 25.

Referring to FIG. 5B, when the elongate nozzle attachment 10 is attached to the main body 2, it drives the sliding unit 22 to slide downwards to its second position against the action of the spring 23 by engaging the extending block 18 with the protruding shoulder 22a of the sliding unit 22. Thus the stop portion 22b of the sliding unit 22 disengages the stop portion 21b of the actuating member 21 and the actuating member 21 can move forward along the direction indicated by the arrow to actuate the switch 7.

Referring to FIG. 5C, the actuating member 21 has moved forward to its "on" position and activated the switch 7 through the key point 21a of the actuating member 21. At the same time, the end portion 21b and stop portion 21c are located between the sliding unit 22 and the locking member 24. The end portion 21b is engaged with the stop portion 22b. The end portion 21b prevents the press portion 24a moving downwardly by depressing the press portion 24a. Thus the elongate nozzle attachment 10 is held securely to the main body 2 by the hook 24b and the recess 19 of the second grip section 5b.

Only when the actuating member 21 is moved backwards to its "off" position can the press portion 24a be depressed to release the elongate nozzle attachment 10 from the main body 2. The user holds the first grip section 5a with one hand and the second grip section 5b with the other hand to depress the press portion 24a with his thumb. The hook 24b disengages the recess 19 of the second grip section 5b. When the elongate nozzle attachment 10 is detached from the main body 2, the sliding unit 22 is urged into its first position (FIG. 5A) by the spring 23 to prevent the actuating member 21 from movement. Thus the motor 3 cannot be actuated by the switch 7 and the safety of the operator is ensured. Only when the elongate nozzle attachment 10 is attached to the main body 2 can the motor 3 be actuated by the switch 7 through movement of the actuating member 21. The volute housing 2b and the fan 4 can be maintained only through removing the elongate nozzle attachment 10 from the main body 2. The detachable connection between the nozzle attachment 10 and main body 2 makes the packaging convenient.

Referring to FIG. 6A, the blower-vacuum device 1 is in vacuum mode. The vacuum port 11a and blower port 12a are close to the ground and terminate substantially in the same plane parallel to the ground. The height H of the blower nozzle 12 and vacuum nozzle 11 along the perpendicular direction is substantially equivalent. The construction of the elongate nozzle attachment 10 makes the centre of gravity of the blower-vacuum device 1 lower. Because of the elongate configuration of the first grip section 5a, the user can adjust to different positions according to requirements. The user can operate the blower-vacuum device 1 with one hand only and a comfortable operating position can be obtained easily.

Referring to FIG. 6B, the blower-vacuum device 1 is in blower mode. The user holds the first grip section 5a with one hand but the holding position has changed with respect to the vacuum mode. The blower-vacuum device 1 is elevated to make the operating position more comfortable.

We claim:

1. A blower-vacuum device convertible between a blower mode and a vacuum mode comprising:
   a main body;

a motor operated by a switch which is housed in the main body;

a motor-driven fan capable of generating an air flow; and a vacuum nozzle associated with the main body upstream of the motor-driven fan in the blower mode and vacuum mode and a blower nozzle associated with the main body downstream of the motor-driven fan in the blower mode and vacuum mode, wherein the vacuum nozzle comprises an elongate main portion extending substantially coaxially with an axis Z1 of the main body and a terminal portion extending substantially coaxially with an axis Z2 angularly upwardly with respect to the axis Z1 of the main body, the terminal portion having an end distanced along axis Z2 from the main portion that is substantially open and defines a vacuum port intersecting axis Z2;

wherein the vacuum nozzle is positioned superior to the blower nozzle and the vacuum nozzle has a deflection point, wherein the blower nozzle has a blower port at its distal end substantially adjacent to the deflection point.

2. A blower-vacuum device as defined in claim 1, wherein the angle β between the axis Z1 and the axis Z2 is obtuse in the range 90 to 180°.

3. A blower-vacuum device as defined in claim 1, wherein the length of the terminal portion is in the range 5 mm to 1 m.

4. A blower-vacuum device as defined in claim 1, wherein the vacuum nozzle and the blower nozzle are detachably associated with the main body and the vacuum nozzle is fixed to the blower nozzle.

5. A blower-vacuum device as defined in claim 4, wherein the main body comprises: a motor housing housing the motor and a volute housing housing the fan, wherein the motor housing is formed integrally with the volute housing.

6. A blower-vacuum device as defined in claim 5 further comprising:
a handle assembly, wherein the handle assembly comprises:
a first grip section disposed on the main body and a second grip section disposed on the vacuum nozzle.

7. A blower-vacuum device as defined in claim 6 further comprising:
a safety interlock, wherein the safety interlock is disposed between the first grip section and the second grip section such that only when the vacuum nozzle is attached to the main body is the motor activatable and only when the motor is inactive is the vacuum nozzle detachable,
a hook engaged with a recess disposed at a rear end of the second grip section,
wherein the safety interlock comprises
an actuating member slidably mounted on the front end of the first grip section, wherein the actuating member is movable between a forward "on" position and a rearward "off" position, wherein the actuating member comprises a key point for activating the switch, a first stop portion and a second stop portion,
a locking member movably disposed in the main body, wherein the locking member comprises a press portion which extends over the surface of the first grip section, wherein the locking member is biased by a spring located in the main body for supporting the locking member to move upwardly and downwardly,
a sliding unit disposed between the locking member and the actuating member for selectively engaging the actuating member, wherein the sliding unit has a protruding shoulder disposed in an intermediate portion and a stop portion disposed at its upper end and is biased by a spring which is disposed under the sliding unit,
an extending block disposed on the second grip section of the nozzle attachment for selectively engaging the protruding shoulder of the sliding unit,
wherein when the elongate nozzle attachment is detached from the main body, the sliding unit biased by the spring disposed under the sliding unit is located at its first position, the stop portion of the sliding unit engages the first stop portion of the actuating member to prevent movement of the actuating member and the locking member is located at its first position biased by the spring located in the main body,
wherein when the elongate nozzle attachment is attached to the main body, the sliding unit is driven to slide downwards to its second position against the action of the spring disposed under the sliding unit by engaging the extending block with the protruding shoulder of the sliding unit such that the stop portion of the sliding unit disengages the first stop portion of the actuating member,
whereby the actuating member is movable forwardly to its "on" position to activate the switch by the key point of the actuating member and the first stop portion and second stop portion are located between the sliding unit and the locking member, wherein the first stop portion is engaged with the stop portion of the sliding unit so that the end portion prevents the press portion moving downwardly by depressing the press portion whereby the elongate nozzle attachment is held securely to the main body by the hook and the recess of the second grip section, and
whereby the actuating member is movable backwardly to its "off" position such that the press portion is depressed so that the hook disengages the recess of the second grip section and the elongate nozzle attachment is detachable from the main body whereby the sliding unit is urged into its first position by the spring to prevent the actuating member from movement.

8. A blower-vacuum device as defined in claim 7 further comprising:
a variable airflow adjustment including an aperture in the blower nozzle and a rotatable collar mounted rotationally about the blower nozzle over the aperture, wherein the rotatable collar has a partial apertured portion wherein by rotating the rotatable collar the whole or a portion of the aperture is exposed via the partial apertured portion thereby enabling an air overflow to be diverted out of the aperture to alter the airflow which is discharged from the blower port; and
an airflow guide mechanism disposed between the vacuum nozzle and blower nozzle for guiding the air overflow from the aperture, wherein when the airflow guide mechanism is opened, the air overflow is guided by the airflow guide mechanism forwardly from the rear of the blower nozzle.

9. A blower-vacuum device convertible between a blower mode and a vacuum mode comprising:
a main body defining an axis Z1;
a motor operated by a switch which is housed in the main body;
a motor-driven fan capable of generating an air flow; and
a vacuum nozzle associated with the main body upstream of the motor-driven fan in the blower mode and vacuum mode and a blower nozzle associated with the main body downstream of the motor-driven fan in the blower mode and vacuum mode, wherein the vacuum nozzle includes a main portion extending substantially coaxially with the axis Z1 and a terminal portion extending substantially coaxially with an axis Z2 curved upwardly with respect to the axis Z1 with the terminal portion extending along axis Z2 toward a distal end that defines a vacuum port intersecting axis Z2, and is attached superiorly adjacent to the blower nozzle;

wherein the vacuum nozzle is positioned superior to the blower nozzle and the vacuum nozzle has a deflection point, wherein the blower nozzle has a blower port at its distal end substantially adjacent to the deflection point.

10. A blower-vacuum device as defined in claim 9, wherein the vacuum nozzle and the blower nozzle are detachably associated with the main body and the vacuum nozzle is fixed to the blower nozzle.

11. A blower-vacuum device as defined in claim 10, wherein the main body comprises: a motor housing housing the motor and a volute housing housing the fan, wherein the motor housing is formed integrally with the volute housing.

12. A blower-vacuum device as defined in claim 11 further comprising:
a handle assembly, wherein the handle assembly comprises: a first grip section disposed on the main body and second grip section disposed on the vacuum nozzle.

13. A blower-vacuum device as defined in claim 12 further comprising:
a safety interlock, wherein the safety interlock is disposed between the first grip section and the second grip section such that only when the vacuum nozzle is attached to the main body is the motor activatable and only when the motor is inactive is the vacuum nozzle detachable,
a hook engaged with a recess disposed at a rear end of the second grip section,
wherein the safety interlock comprises
an actuating member slidably mounted on the front end of the first grip section, wherein the actuating member is movable between a forward "on" position and a rearward "off" position, wherein the actuating member comprises a key point for activating the switch, a first stop portion and a second stop portion,
a locking member movably disposed in the main body, wherein the locking member comprises a press portion which extends over the surface of the first grip section, wherein the locking member is biased by a spring located in the main body for supporting the locking member to move upwardly and downwardly,
a sliding unit disposed between the locking member and the actuating member for selectively engaging the actuating member, wherein the sliding unit has a protruding shoulder disposed in an intermediate portion and a stop portion disposed at its upper end and is biased by a spring which is disposed under the sliding unit,
an extending block disposed on the second grip section of the nozzle attachment for selectively engaging the protruding shoulder of the sliding unit,
wherein when the elongate nozzle attachment is detached from the main body, the sliding unit biased by the spring disposed under the sliding unit is located at its first position, the stop portion of the sliding unit engages the first stop portion of the actuating member to prevent movement of the actuating member and the locking member is located at its first position biased by the spring located in the main body,
wherein when the elongate nozzle attachment is attached to the main body, the sliding unit is driven to slide downwards to its second position against the action of the spring disposed under the sliding unit by engaging the extending block with the protruding shoulder of the sliding unit such that the stop portion of the sliding unit disengages the first stop portion of the actuating member,
whereby the actuating member is movable forwardly to its "on" position to activate the switch by the key point of the actuating member and the first stop portion and second stop portion are located between the sliding unit and the locking member, wherein the first stop portion is engaged with the stop portion of the sliding unit so that the end portion prevents the press portion moving downwardly by depressing the press portion whereby the elongate nozzle attachment is held securely to the main body by the hook and the recess of the second grip section, and
whereby the actuating member is movable backwardly to its "off" position such that the press portion is depressed so that the hook disengages the recess of the second grip section and the elongate nozzle attachment is detachable from the main body whereby the sliding unit is urged into its first position by the spring to prevent the actuating member from movement.

14. A blower-vacuum device as defined in claim 13 further comprising:
a variable airflow adjustment including an aperture in the blower nozzle and a rotatable collar mounted rotationally about the blower nozzle over the aperture, wherein the rotatable collar has a partial apertured portion wherein by rotating the rotatable collar the whole or a portion of the aperture is exposed via the partial apertured portion thereby enabling an air overflow to be diverted out of the aperture to alter the airflow which is discharged from the blower port; and
an airflow guide mechanism disposed between the vacuum nozzle and blower nozzle for guiding the air overflow from the aperture, wherein when the airflow guide mechanism is opened, the air overflow is guided by the airflow guide mechanism forwardly from the rear of the blower nozzle.

* * * * *